No. 836,651. PATENTED NOV. 20, 1906.
H. H. PULVER.
VENDING MACHINE.
APPLICATION FILED FEB. 7, 1903.

2 SHEETS—SHEET 1.

Witnesses
Walter B. Payne
G. Willard Rich

Inventor
Henry H. Pulver
By Frederick F. Church
his Attorney

No. 836,651. PATENTED NOV. 20, 1906.
H. H. PULVER.
VENDING MACHINE.
APPLICATION FILED FEB. 7, 1903.
2 SHEETS—SHEET 2.
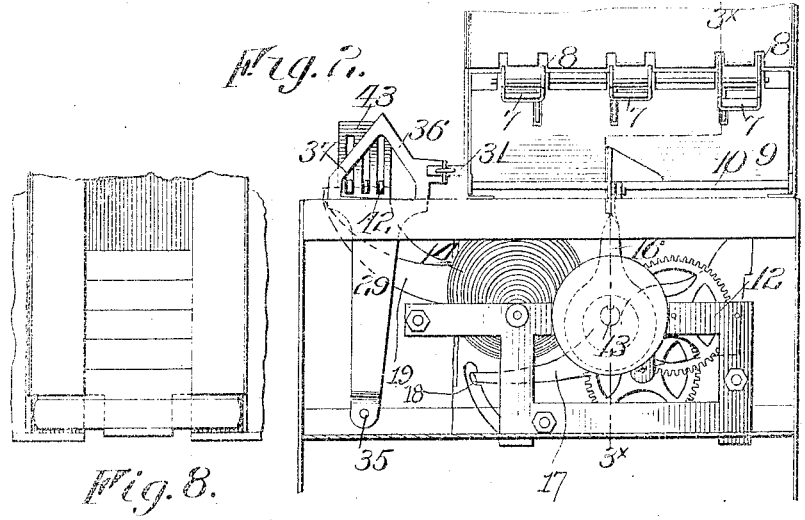
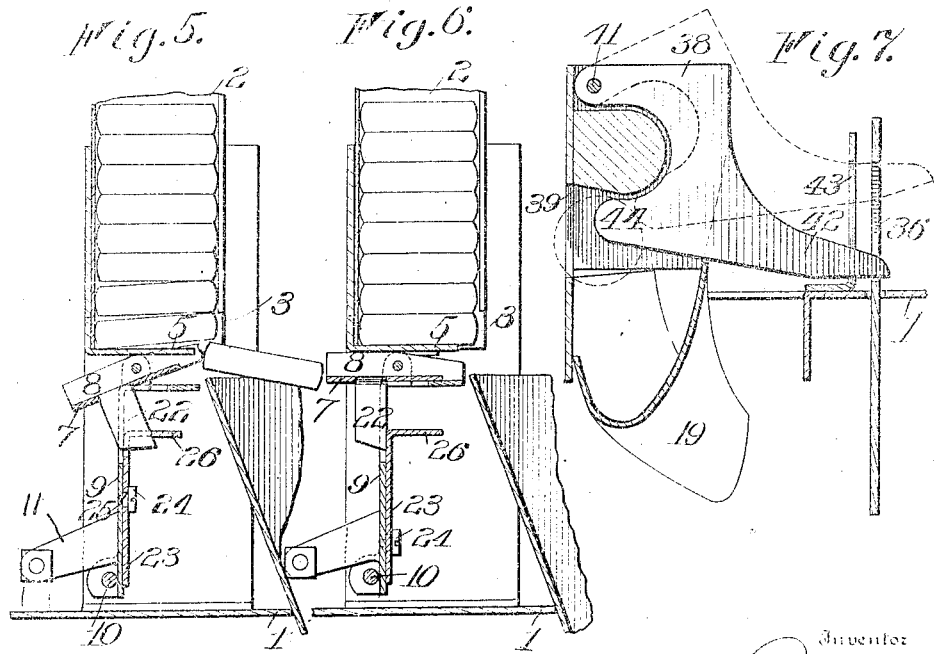
Witnesses
Walter B. Payne
G. Willard Rich.
Inventor
Harry H. Pulver
Frederick F. Church
his Attorney

UNITED STATES PATENT OFFICE.

HENRY H. PULVER, OF ROCHESTER, NEW YORK, ASSIGNOR, BY MESNE ASSIGNMENTS, TO PULVER CHOCOLATE AND CHICLE MANUFACTURING COMPANY, OF ROCHESTER, NEW YORK, A CORPORATION OF NEW YORK.

VENDING-MACHINE.

No. 836,651.    Specification of Letters Patent.    Patented Nov. 20, 1906.

Application filed February 7, 1903. Serial No. 142,349.

*To all whom it may concern:*

Be it known that I, HENRY H. PULVER, of Rochester, in the county of Monroe and State of New York, have invented certain new and useful Improvements in Vending-Machines; and I do hereby declare the following to be a full, clear, and exact description of the same, reference being had to the accompanying drawings, forming a part of this specification, and to the reference-numerals marked thereon.

My present invention relates to vending-machines embodying generally a receptacle or casing adapted to contain goods, a delivery device coöperating therewith, and means for operating it; and it has for its object to provide in connection with a plurality of such receptacles and delivery devices a selecting mechanism adapted to be operated by a coin, whereby the operating means is set in motion to deliver goods from a desired receptacle.

To these and other ends the invention consists in certain improvements and combinations of parts, all as will be hereinafter more fully described, the novel features being pointed out in the claims at the end of the specification.

Figure 1:
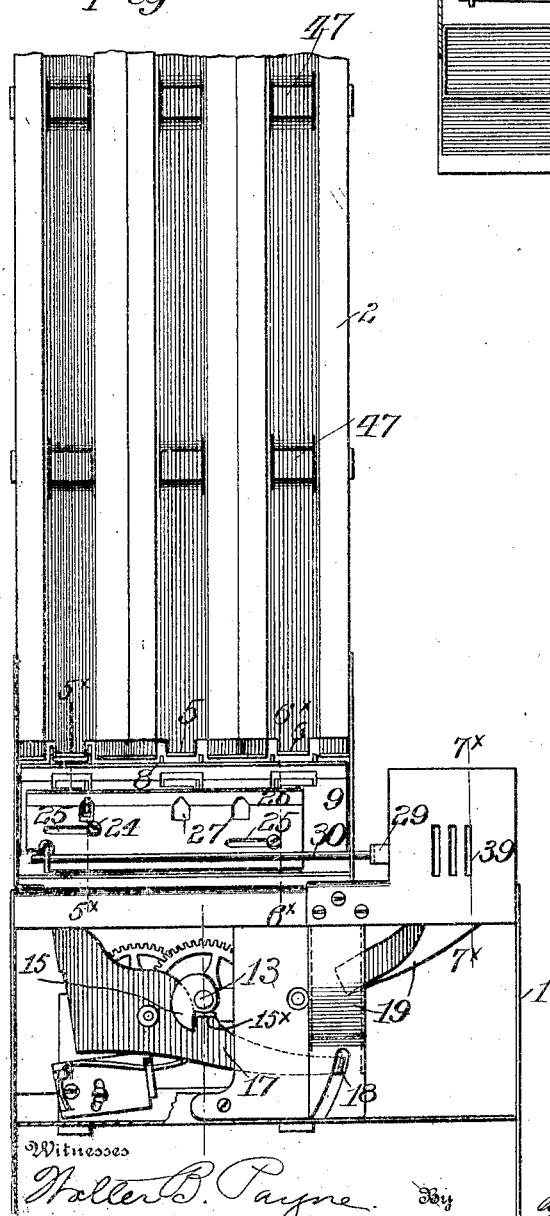
Figure 4:
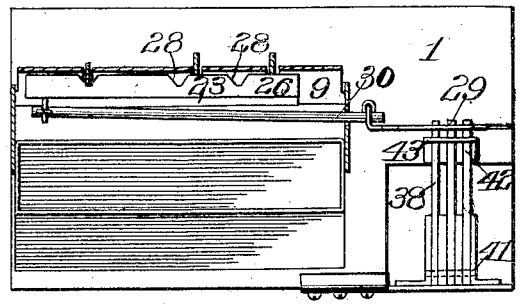
Figure 3:
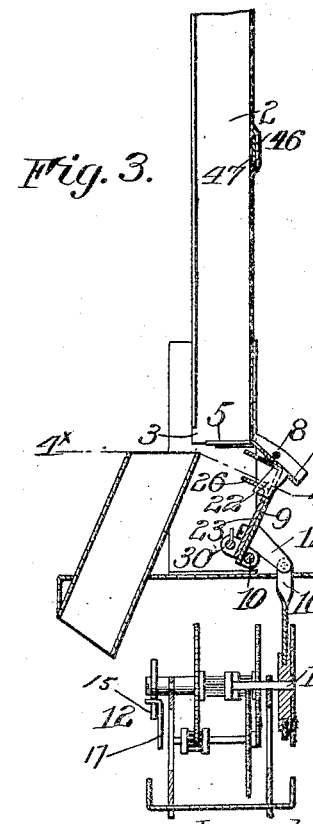

In the drawings, Figure 1 is a front elevation of the operating mechanism of a vending-machine constructed in accordance with my invention. Fig. 2 is a rear elevation thereof. Fig. 3 is a vertical sectional view taken on the line $3^\times 3^\times$ of Fig. 2. Fig. 4 is a horizontal sectional view on the line $4^\times 4^\times$ of Fig. 3. Fig. 5 is a detail sectional view on the line $5^\times 5^\times$ of Fig. 1, and Fig. 6 is a similar view on the line $6^\times 6^\times$ of Fig. 1, and Fig. 7 is a sectional view on the line $7^\times 7^\times$ of Fig. 1. Fig. 8 is an enlarged front elevation of the discharge end of one of the channels or receptacles.

Similar reference-numerals in the several figures indicate similar parts.

A vending-machine constructed in accordance with my invention embodies a main frame or support 1, upon which is mounted a plurality of receptacles in the form of channels or reservoir 2, adapted to contain the goods to be vended, which are open at their forward sides and at their lower ends, as indicated at 3, to permit the goods or the packages in which they are contained to be ejected therefrom. The bottoms of the receptacles are provided with slots or apertures extending at opposite sides of central fingers or supports 5, and the latter are raised slightly, as shown in Fig. 8, so that the friction upon the packages of goods resting thereon is applied centrally thereof. The ejecting members, to be further described, operating at each side of the finger, engage the package and prevent it from becoming turned or twisted during the delivery operation. The delivery mechanism by means of which the goods or packages thereof are ejected from the channels or receptacles embodies the ejecting members 7, having the upwardly-extending side portions 8, which when the members are operated pass through the receptacles at each side of the fingers 5, as shown in Fig. 5. The several ejecting members are pivotally mounted upon an oscillating plate or carrier 9, pivoted at 10 and connected, by means of an arm 11, to suitable operating mechanism 12. This mechanism may be of any suitable construction adapted to be controlled by a coin, and in the present instance I have shown it as consisting of a clock-train embodying a rotary driving-shaft 13, operated by a main-spring 14, and which is attached to the arm 11 on the plate or carrier 9 by a connecting-rod 16, having a crank or eccentric connection with said rod. At the outer end of the driving-shaft is a cam having the point 15, adapted to engage a finger on the pivoted controlling-lever, which governs the operation of the driving-shaft and is indicated by 17, having its outer end provided with a projection or portion 18, extending into the coin-channel 19 and adapted to be operated by the passage of a coin therein to carry the finger $15^\times$ out of the path of the cam-point to allow the driving-shaft to make a single revolution, as will be understood. The ejecting members 7 are provided at their lower sides with fingers 22, which are arranged in rear of their pivotal points, tending to tilt the members to the normal or operative position, as shown in full lines in Fig. 5, the fingers being permitted to pass through suitable apertures in the plate 9.

In order to provide means whereby an operator may select the particular variety of goods he desires from one or another of the receptacles or channels, I provide a selecting member, which is so operated that when any one of the ejecting members are in operative position the others will be moved to the inoperative position, whereby the goods will be delivered from but one of the several channels. This object may be accomplished in different ways; but the one which I have shown is simple and consists in providing the selecting member in the form of a plate 23, mounted upon the oscillatory plate or carrier 9, to which it is secured by means of screws 24, extending through slots or elongated apertures 25. The plate is provided at its upper edge with a flange 26 and apertures 27, one for each of the fingers 22 on the ejecting members. Also formed in the flange 26 and in line with said apertures are V-shaped recesses, the sides 28 of which are inclined relatively to the face of the carrier to form cam-surfaces, which coöperate with the edge of the fingers 22 to move the members 7 into and out of operative position when the selecting member is moved relatively thereto.

In order to shift the selecting member to cause the delivery of goods from a particular receptacle, I provide a movable set plate or member 29, which is connected to it by means of a rod or pitman 30. The set plate is pivoted at its lower end at 35 and at its upper end is provided with an aperture having relatively inclined or diverging sides 36 and 37, forming cam-surfaces with which engage a series of keys or actuating members 38, adapted to be controlled by a coin. To this end the keys are constructed of plates, as shown, which are arranged in rear of the slots or entrance-apertures 39 in front of the casing leading into the coin-channel 19. These keys are pivoted at 41 and are provided with rearwardly-extending ends or fingers 42, which are guided in apertures in a plate 43 and extend into the aperture in the set-plate 29, where they lie, when in the normal position, below the surfaces 36 and 37, as shown in full lines in Fig. 7. Each of the keys are provided with the forwardly-extending end or abutment 44, which is engaged by the coin when it is inserted through the respective aperture 39 in front of the key, so that when the latter is forced inwardly by the coin it is raised to the position shown in dotted lines in Fig. 7, engaging one of the surfaces 36 or 37 and shifting the plate 29 until it is centered in line with the key. This movement causes the plate 23 to be moved into such position that the finger 22 on the ejecting member 7, corresponding to the aperture 39, in which the coin was inserted, is allowed to move into the aperture 27 in the plate 23, thus setting the ejecting member in the operative position, as shown in Fig. 5. As the other apertures are by this movement of the plate moved out of alinement with their respective fingers 22, the other ejecting members are held in the inoperative position, as indicated in Fig. 6.

The apertures 39 may be conveniently located in the casing, and the channel 19 may be extended in rear thereof to conduct the coin so that it may also operate the controlling-lever 17 to release the operating mechanism.

The channels or receptacles 2 are preferably formed separately and of sheet metal, so that machines embodying different numbers of receptacles may be readily assembled. As a simple and convenient means of securing these channels together I provide each with a band or strap 46, which is formed, as shown, by striking up a portion of the metal by a suitable die to provide loops through which a flat band or bar 47 may be passed. The ends of the bar are bent over into engagement with the sides of the end channels of the group, securely attaching them together.

When the machine is in operation, the various classes of goods to be vended are placed in the several receptacles or channels 2, and if the purpose of the machine be for vending chewing-gum the packages or sticks of each flavor are stacked in the respective receptacles, so that the purchaser may select a package of the desired flavor by inserting the coin in one or another of the apertures 39. This operation of inserting the coin causes one of the actuating members 38 to be moved upwardly in the position shown in dotted lines in Fig. 7 when its rearwardly-extending end or finger 42 coöperates with one or the other of the cam-surfaces 36 and 37 to move the set-plate 29 and shift the selecting member 23 into such a position as to release the delivering mechanism coöperating with the receptacle corresponding to the aperture in which the coin was inserted. After raising the plate 38, the coin passes down a channel 19, where it engages the projection 18 on the controlling-lever 17, revolving the latter sufficiently to carry the finger to 15× out of the path of the cam-point 15 to release the driving-shaft 13 and permit it to be rotated by the clock-train. This shaft makes a complete revolution at each operation, and the connecting-rod 16 operated thereby rocks the carrier 9. As before explained, only one of the ejecting members is allowed to assume the operative position shown in Fig. 5, the remaining members being moved into an inoperative position by the selecting member, as shown in Fig. 6, so that a package of goods will only be ejected from one of the several receptacles when the carrier is operated. The separate keys or actuating members for each receptacle may be adapted for operation by coins of one size or denomination, or they may be arranged for coins of different values, thus enabling the machine to be employed for vending different grades of articles. The portions on the ejecting devices operating through the receptacles at opposite sides of the central fingers and the latter being elevated slightly above the portions at either side and extended in advance thereof causes the packages to be delivered without being turned or twisted, which prevents any possibility of their becoming lodged in the chute through which they pass.

I claim as my invention—

1. In a vending-machine, the combination with a plurality of receptacles for goods, delivery devices corresponding to the receptacles and means for operating them, of a selecting mechanism coöperating with the delivery devices for setting one or another of them in operative position and a plurality of coin-operated actuating devices coöperating with the selecting mechanism and corresponding to each of the receptacles.

2. In a vending-machine, the combination with a plurality of receptacles, a delivery device for each and means for operating said devices, of a selecting mechanism for each receptacle coöperating with the delivery devices to set their respective device in operative position and move the remaining devices into an inoperative position and means for operating said delivery devices.

3. In a vending-machine, the combination with a plurality of receptacles, delivery devices therefor and means for operating them, of a selecting mechanism coöperating with the delivery devices and a separate actuating device corresponding to each receptacle and coöperating with said mechanism to set their respective delivery devices in operative position and prevent the operation of the remaining devices.

4. In a vending-machine, the combination with a plurality of receptacles, delivery devices corresponding to the several receptacles and a selecting mechanism coöperating with said devices to set one or another of them in operative position, of a member for actuating the selecting mechanism and a plurality of coin-controlled devices corresponding to each of the receptacles for operating the member and coin-controlled mechanism for operating the delivery devices.

5. In a vending-machine, the combination with a plurality of receptacles, delivery devices therefor and a selecting mechanism coöperating with said devices, of a coin-channel and members arranged in the channel corresponding to the several receptacles for actuating the selecting mechanism, means for automatically operating the delivery devices embodying a lever adapted to be operated by a coin having a portion arranged in the coin-channel.

6. In a vending-machine, the combination with a plurality of receptacles delivery devices and means for operating them, of a selecting mechanism coöperating with the delivery devices and adapted to alternately move them into operative position and a plurality of members corresponding to the several receptacles for actuating the selecting mechanism to set the corresponding delivery device in operative position relatively to its respective receptacle.

7. In a vending-machine, the combination with a plurality of receptacles, a delivery device for each and means for operating them simultaneously, of a selecting mechanism, a separate actuating member corresponding to each receptacle and coöperating with said mechanism to set the respective delivery device in operative position and the other delivery devices in an inoperative position.

8. In a vending-machine, the combination with a plurality of receptacles, a delivery device for each and means for setting them, of an operating member attached to said means having cam-surfaces thereon, a plurality of keys corresponding to the several receptacles for shifting said member and mechanism for operating the delivery devices relatively to the receptacles.

9. In a vending-machine, the combination with a plurality of receptacles, delivery devices and means for setting them in operative position, of a movable plate attached to said means and provided with cam-surfaces, of a coin-actuated member for each receptacle adapted to engage one of the cam-surfaces to set the delivery device of the corresponding receptacle in operative position and means for automatically operating the delivery devices.

10. In a vending-machine, the combination with a plurality of receptacles, a carrier and means for oscillating it, an ejecting member on the plate for each receptacle, mechanism for moving them into and out of operative position and a plate attached to said mechanism having diverging cam-surfaces, of a coin-channel, keys arranged at the entrance thereof and corresponding to the receptacles and adapted to be operated by a coin and ends on the keys adapted to engage the cam-surfaces.

11. In a vending-machine, the combination with a plurality of receptacles, a carrier, means for oscillating it and an ejecting member for each receptacle pivotally mounted on the carrier and provided with an arm, of a plate movably mounted on the carrier and engaging the arms to set the ejecting members in an inoperative position, a setting-plate attached to the plate on the carrier and keys engaging therewith to operate the ejecting members.

12. In a vending-machine, the combination with a plurality of receptacles, a carrier arranged beneath the latter and an ejecting device for each receptacle, journaled on the carrier and provided with an arm, of a plate movably mounted on the carrier, provided with apertures for the several arms and having cam-surfaces coöperating with the latter to move their respective devices to the inoperative position, means for oscillating the carrier and devices for shifting the plate thereon.

13. In a vending-machine, the combination with a plurality of receptacles, ejecting devices therefor, a selector for setting them in operative position and means for operating said devices, of a pivoted setting-plate attached to the selector and provided with an aperture having the converging sides, of a coin-channel having entrance-apertures, one of which corresponds to each receptacle, keys arranged in rear of said apertures and adapted to be operated by a coin and portions on the keys coöperating with the cam-surfaces to set the delivery device of the corresponding receptacle in operative position.

HENRY H. PULVER.

Witnesses:
G. WILLARD RICH,
RUSSELL BENEDICT GRIFFITH.